United States Patent Office 3,109,961
Patented Nov. 5, 1963

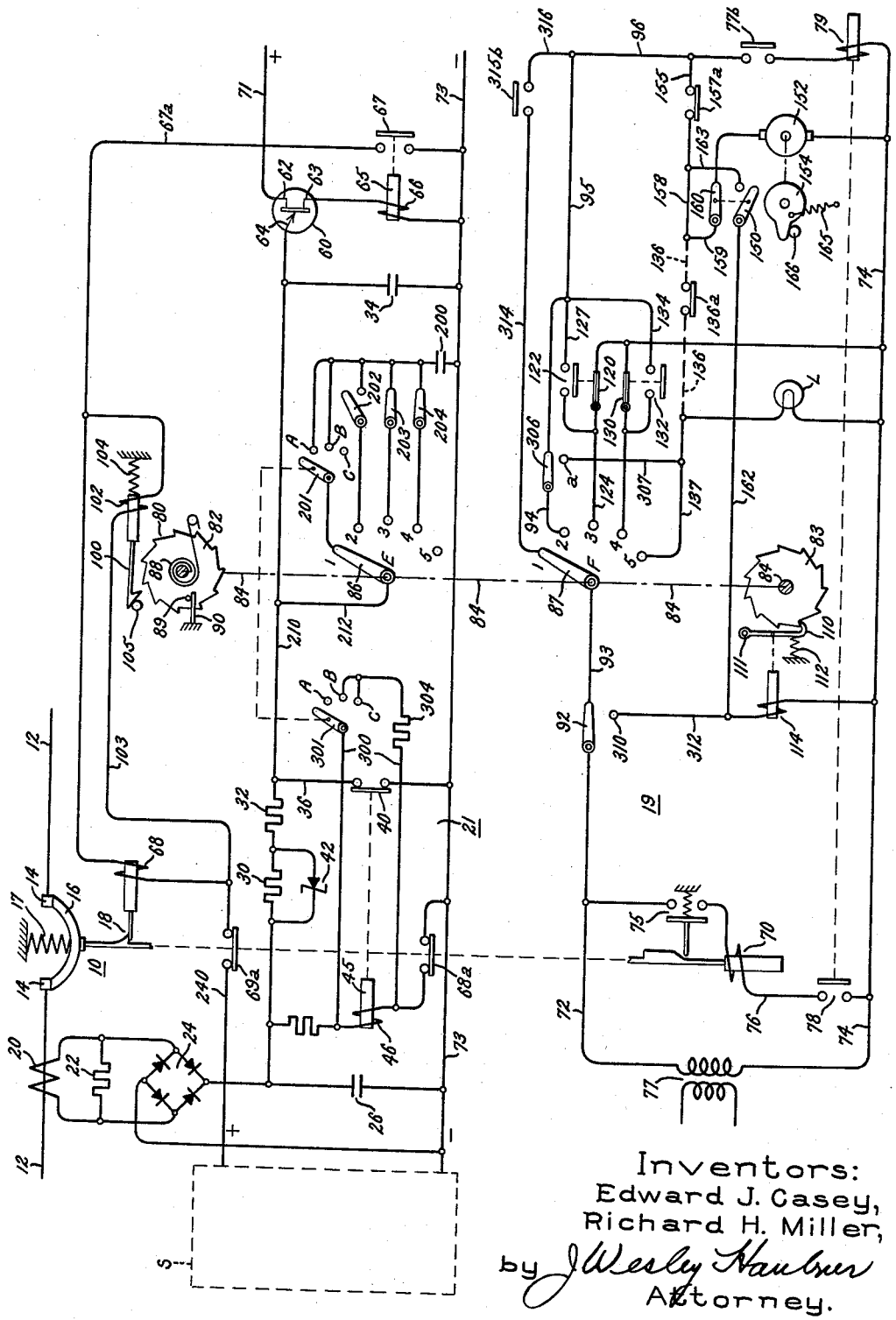

3,109,961
AUTOMATIC CIRCUIT RECLOSER WITH COLD
LOAD PICKUP MEANS
Edward J. Casey, Media, and Richard H. Miller, Havertown, Pa., assignors to General Electric Company, a corporation of New York
Filed Aug. 14, 1961, Ser. No. 131,394
6 Claims. (Cl. 317—22)

This invention relates to an automatic circuit recloser and, more particularly, relates to cold load pickup means for controlling the operation of the recloser after it has been restored to its closed position following lock-out.

The usual automatic recloser can respond to the occurrence of a fault by repetitively opening and closing several times in close succession. If the fault is a permanent one, the recloser locks out, or remains open, after a predetermined number of these closely successive operations. If the fault is a temporary one that is cleared or disappears at some time prior to the instant at which lock-out otherwise would have occurred, then the recloser will remain closed once the fault disappears.

After a recloser has locked out, it usually remains open for a relatively long time, and the various loads connected thereto are therefore deenergized and cease operating. In the more common circuit applications, these loads are constituted by motors and similar devices that demand a much higher current for starting than for running. Accordingly, when the recloser in such a circuit is restored to its closed position following such a lock-out period, a heavy inrush current flows in view of the simultaneous demand of the loads for high starting current.

If a circuit is to be successfully reenergized, the recloser must be able to remain closed despite this high inrush current. This presents a problem with the type of recloser that is designed for a quick first opening operation because many such reclosers will open in response to the high inrush current. Before the inrush current can subside to a normal level, the recloser will have opened thereby preventing successful reenergization of the circuit. The means that we rely upon for preventing this unnecessary opening of the recloser under these inrush current conditions, we refer to hereinafter as being cold load pickup means.

Numerous solutions to this problem have been proposed, but these have generally been subject to certain serious disadvantages. For example, one proposed solution of which we are aware has involved temporarily isolating the opening control means of the recloser from the signal voltage that initiates opening, so that the recloser is incapable of responding to the signal voltage irrespective of how high this voltage is. This approach is disadvantageous because it renders the recloser incapable of protecting the system against any fault current which might flow during this isolation period. Fault current can be much higher than the usual inrush current and can produce serious damage to the system unless quickly interrupted. Thus, rendering the recloser temporarily incapable of responding to fault current presents a serious risk of system damage. Another approach that we are aware of has involved holding the usual sequencing device of the recloser in or near its lock-out position for a predetermined period following return of the recloser to closed position. This is disadvantageous in that it limits the number of operations that the recloser can perform in close succession in response to a fault occurring shortly after such reclosing.

Accordingly, an object of our invention is to provide new and improved means for causing the recloser to remain closed despite inrush currents of the above-described character, yet without affecting the ability of the recloser to open in response to fault current that might flow immediately following a reclosing operation that follows an extended lock-out.

Another object is to provide recloser control means of this type which can also be used to change the current level at which the recloser will respond during a predetermined interval following reclosing. By raising this current level during this interval, the recloser can be desensitized to ordinary inrush currents, yet without affecting its ability to respond to fault currents, which are of a higher magnitude.

In carrying out our invention in one form, we provide a recloser that comprises means for opening the recloser in response to an overcurrent and means for automatically reclosing the recloser following an opening operation. The recloser further comprises sequencing means that is advanceable in a step-by-step manner from a normal position through a series of intermediate positions to a lock-out position in response to closely successive operations of the recloser. The reclosing means is rendered inoperable to automatically reclose the circuit breaker when the sequencing means is in its lock-out position, so that lock-out of the recloser is effected when the sequencing means is in the lock-out position. After lock-out, reclosing can be effected by manually controlled means that restores the sequencing means to its normal position and is effective when the sequencing means has been so restored to cause the reclosing means to reclose the recloser. For controlling the opening time of the recloser, a timing circuit is provided that includes a capacitor that can be connected into and disconnected from the timing circuit. When the capacitor is connected in the timing circuit, the opening time is longer than when the capacitor is disconnected therefrom. A manually-operable switch is connected in series with this capacitor, and switching means controlled by the sequencing means and connected in series with the manually-operable switch and the capacitor is provided for connecting the capacitor into the timing circuit when the sequencing means is in its normal position and the manually-operable switch is closed. The manually-operable switch is effective in an open position to disconnect the capacitor from the timing circuit while the sequencing means is in its normal position. With this manually-operable switch open, first opening operations of the recloser will be effected quickly, but with this manually-operable switch closed, first opening operations of the recloser will be effected with increased time delay due to the presence of the timing capacitor. Thus, by closing this manually-operable switch after lock-out and before a subsequent reclosing, we can introduce extended time delay into the first opening operation immediately following reclosing after lock-out.

For a better understanding of our invention, reference may be had to the accompanying drawing taken in conjunction with the following description, wherein The single FIGURE is a schematic diagram of an automatic circuit reclosed embodying one form of our invention. The circuit recloser is shown in its closed normal at-rest position.

Our invention will be explained in connection with an automatic recloser such as disclosed and claimed in application Serial No. 119,884—Miller and Streater, filed June 27, 1961, and assigned to the assignee of the present invention. Such a recloser is generally shown at 10 in the drawing. This recloser 10 controls the flow of current through a power line 12, which may be one phase of a polyphase A.C. power system. The circuit recloser comprises a set of stationary contacts 14 and a movable bridging contact 16 biased in a direction away from the stationary contacts by a suitable compression spring 17. The recloser 10 is normally maintained in its closed position of the drawing by a suitable trip latch 18 that can be released in a manner soon to be described to permit the spring 17 to separate the contacts 16 and 14 and thereby interrupt the flow of current through power line 12.

Ordinarily, after an opening operation, the recloser 10 is automatically reclosed so that service can be restored over the power line 12 in the event that the condition responsible for opening of the recloser is no longer present. These reclosing operations are controlled by a portion of the recloser generally designated 19 in the drawing.

*Opening Control Portion of Recloser*

Opening operations of the recloser 10 are controlled by a portion of the recloser generally designated 21. This opening control portion 21 is similar in many respects to the circuit breaker arrangement disclosed in copending application S.N. 74,325—Casey and Sofianek, filed December 7, 1960, and assigned to the assignee of the present invention. Certain features of this tripping circuit are disclosed in greater detail and are claimed in the aforementioned Casey and Sofianek application, and reference may be had thereto if more information is desired as to these features.

Generally speaking, the opening control portion 21 is designed to trip the recloser open in response to overcurrents in the power line 12 above a predetermined pickup value. Such tripping will occur with a time delay that varies in duration inversely with respect to the magnitude of the overcurrent.

For sensing the magnitude of the current flowing in power line 12, a current transformer secondary winding 20 magnetically coupled to the power line 12 is provided. Connected across the terminals of the current transformer winding 20 is a suitable resistor 22, across which is developed an alternating voltage that is proportional to the current flowing through the current transformer winding 20, and, hence, through the power line 12. The current transformer 20 is so designed that it will not saturate at any currents within the current range which circuit recloser 10 is intended to operate, so that for all such currents the proportional relationship of line current to the voltage developed across resistor 22 will be essentially maintained.

The voltage developed across the resistor 22 is rectified by a conventional rectifying bridge 24 connected across the resistor 22, and the full wave output from this bridge is smoothed by a smoothing capacitor 26 connected across the output terminals of the rectifying bridge. Accordingly a relatively smooth unidirectional voltage, hereinafter termed the signal voltage, is developed across the terminals of the capacitor 26. This signal voltage is also essentially proportional to the magnitude of the current flowing through power line 12.

For developing a voltage that builds up at a rate that varies directly with respect to the magnitude of the signal voltage once the signal voltage exceeds a predetermined value, a suitable timing circuit connected across the terminals of smoothing capacitor 26 is provided. This timing circuit comprises a plurality of resistors 30 and 32 and a timing capacitor 34, all connected in series circuit relationship when the timing circuit is active. Normally, the timing circuit is rendered inactive by a low impedance discharge circuit 36 shunting the timing capacitor 34 and preventing a significant charge from being built up across the capacitor. The timing circuit is rendered active only when a set of contacts 40, connected in the discharge circuit 36, are opened to interrupt the discharge circuit. This is done in a manner soon to be explained.

The timing circuit is designed so that once it becomes active, the voltage across the timing capacitor 34 builds up to a predetermined critical level (soon to be described) in a time inversely proportional to the magnitude of the overcurrent for low values of overcurrent. For high values of overcurrent, this time is inversely proportional to approximately the square of the overcurrent. This change in timing for different levels of overcurrent is achieved by means of a Zener diode 42 shunting one of the resistors 30. This relationship, which is not a part of our invention, is disclosed in more detail and is claimed in application S.N. 138,476—Dewey, filed September 15, 1961, and assigned to the assignee of the present invention.

For rendering the timing circuit active when the current in power line 12 exceeds a predetermined value, which is referred to hereinafter as the pickup rating of the recloser, a gating relay 45 having an operating coil 46 connected across the terminals of the smoothing capacitor 26 is provided. This gating relay includes the aforementioned normally closed contacts 40 that are connected in the discharge circuit 36 around the timing capacitor 34. When the signal voltage developed across smoothing capacitor 26 exceeds a predetermined value (corresponding in magnitude to the rated pickup current of the recloser), the coil 46 of the relay becomes sufficiently energized to cause the relay to operate and open its contacts 40. This removes the discharge circuit 36 from around the timing capacitor 34 and thus allows the timing capacitor to begin its timing function, i.e., renders the timing circuit active.

For tripping the circuit breaker 10 when the output voltage from the timing circuit reaches a predetermined value, a level detector 60 in the form of a silicon unijunction transistor is provided. This unijunction transistor 60 is of a conventional form, such as disclosed and claimed in U.S. Patent No. 2,769,926—Lesk, assigned to the assignee of the present invention, and it will therefore be explained only in sufficient detail to provide an understanding of the present invention. Referring now to the unijunction transistor 60, 62 and 63 represent the two bases of the transistor, and 64 represents the emitter of the transistor. The two bases 62 and 63 are connected across a source of control voltage comprising a positive bus 71 and a negative bus 73 between which a constant voltage is maintained. So long as the voltage between the emitter 64 and the lower base 63 is below a certain critical value, called the peak point emitter voltage, a very high resistance is present between the emitter and the two bases, and therefore no significant amount of current flows in the circuit of emitter 64. However, when the emitter voltage is increased to this critical peak point emitter voltage, the transistor 60 fires, i.e., the resistance between its emitter 64 and base 63 suddenly drops, allowing greatly increased current to flow from the emitter 64 through the base 63. This greatly increased current is derived from the timing capacitor 34, which, in response to firing of the transistor 60, quickly discharges through the circuit including the emitter 64 and the base 63. Connected in series-circuit relationship with the lower base 63 is the coil 66 of a tripping relay 65. The abruptly increased current that flows through the base 63 in response to firing of the transistor 60 also flows through this coil 66, causing the relay 65 to pick up and close its contact 56. Closing of the contacts 67 completes a tripping circuit through a trip coil 68 of the latch 18. The trip coil 68 responds by releasing the latch 18 to allow the recloser 10 to open under the bias of its opening spring 17. When the recloser 10 opens, an "*a*" switch 69*a* connected in the tripping circuit opens to interrupt the tripping circuit. The power source for the tripping circuit is shown within a dotted line box S and comprises a positive bus 240 and negative bus 73 common to this and other circuits. The trip circuit extends from the positive bus 240 to the negative bus 73 through the "*a*" switch 69*a*, trip coil 68, conductor 67*a*, and contacts 67. The details of this source S form no part of the present invention and have been omitted from this description for the sake of simplification.

While we have shown an electromagnetic type tripping relay for initiating tripping in response to firing of level detector 60, it should be understood that other types of electroresponsive switches can equally well be used for initiating tripping in response to firing of the level detector, e.g., a silicon controlled rectifier triggered by the voltage developed when current flows through a suitable resistor (not shown) connected between base 63 and the negative bus 73.

When the recloser opens, the gating relay 45 is dropped out either due to the loss of signal voltage across the smoothing capacitor 26 that results from the interruption of current in power line 12 or due to opening of a conventional "a" switch 68a coupled to the main contacts of the recloser and in series with the coil 46 of the gating relay, depending upon which of these events occurs first. When the gating relay 45 drops out, it closes its contacts 40 to complete the discharge circuit 36 and thus assure that the capacitors of the timing circuit will be drained of their charge.

*Closing Control Portion of Recloser*

The closing control portion 19 of the recloser is designed to automatically reclose the circuit breaker 10 after this first opening operation. For producing such reclosing, a suitable closing device, such as a solenoid 70, is provided. The armature of this solenoid 70 is mechanically connected through a suitable mechanism (not shown) to the bridging contact 16 and is capable of driving the contact 16 into its closed position of the drawing when the solenoid is energized and operated. The coil of the solenoid 70 is connected in an energizing circuit 76 extending between the opposite terminals 72 and 74 of a suitable source of control power for closing. In the drawing this source is illustrated as a transformer 77, which is capable of supplying constant frequency alternating current. Also connected in this energizing circuit 76, and in series with the coil of solenoid 70, are a limit switch 75 that is arranged to close in response to opening of the circuit breaker and a set of closing-control contacts 78. When the closing control contacts 78 are closed, they complete this energizing circuit 76 and thus cause the solenoid 70 to drive the recloser's contact 16 into closed position. The closing control contacts 78 are the normally open contacts of a reclosure-initiating relay 79 that is operated to close its contacts 78 in response to circuit breaker opening in a manner soon to be described. When the contacts 16 of the recloser enter their closed position, the limit switch 75 opens to interrupt the energizing circuit for the closing solenoid 70. In addition, a "b" switch 77b in series with the coil of the reclosure-initiating relay 79 opens upon completion of the closing stroke to drop out the relay 79. This "b" switch 77b is mechanically connected to the main contacts of the circuit recloser in a conventional manner (not shown) so as to open when the circuit recloser is closed and to close when the circuit recloser is open.

For controlling the reclosure-initiating relay 79 and for performing certain other control functions soon to be explained, a counting or sequencing device 80 is provided. In its schematic form of the drawing, this sequencing device 80 comprises a pair of ratchet wheels 82 and 83 that are fixed to a rotatable shaft 84 for movement in unison. Also fixed to the rotatable shaft 84 are two angularly-movable switching arms 86 and 87 which move in unison with each other and with the ratchet wheels 82 and 83. These switching arms constitute portions of stepping switches E and F, respectively. After each opening operation on which automatic reclosing is desired, this sequencing device 80 operates to set up an energizing circuit for the reclosure-initiating relay 79. This will be explained more fully after the sequencing device is described in greater detail.

The ratchet wheel 82 is normally maintained in its position of the drawing by means of a suitable coil spring 88 urging the ratchet wheel 82 in a counterclockwise direction. This coil spring 88 serves as a resetting means for the sequencing device 80 in a manner soon to be described. A suitable stop 89 provided on the ratchet wheel 82 abuts against a stationary abutment 90 to assure that the ratchet wheel will not move counterclockwise past its position of the drawing. When the ratchet wheel 82 is in its illustrated position, each of the switching arms 86 and 87 engages its corresponding first contact, designated 1. When the ratchet wheel is advanced in a clockwise direction through one step (in a manner soon to be explained), the switching arms 86 and 87 are advanced through one step into a position where each engages its next contact 2. Each additional advancing step of the ratchet wheel moves the switching arms 86 and 87 through an additional step, causing each of the switching arms to successively engage its contacts 3, 4, and 5.

When the contact 2 is engaged by the switching arm 87, an energizing circuit for the reclosure-initiating relay 79 is established, and this results in closing of the recloser, as was described hereinabove. This energizing circuit for the reclosure-initiating relay 79 extends from one bus 72 through a manually operable switch 92, conductor 93, the conductive switching arm 87, contact point 2, conductors 94, 306, 95, 96, and 97, the then-closed "b" switch 77b, the coil of relay 79 to the opposite bus 74. The reclosure-initiating relay 79 responds to completion of this energizing circuit by closing its contacts 78 to produce a reclosing operation. When the contacts 3 and 4 of the stepping switch F are engaged by the switching arm 87, similar energizing circuits for the reclosure-initiating relay 79 are set up, but a detailed description of these will be deferred until later in this application.

The ratchet wheel 82 of the sequencing device 80 is advanced through each of the above described steps in response to opening operations of the recloser. In this regard, each time the recloser is tripped to open, the ratchet wheel is advanced one step. If a series of opening operations should occur in close succession, the ratchet wheel 82 and the switching arms 86 and 87 will move successively through positions 2, 3, 4, and 5. But if the recloser, after reclosing, is able to remain closed for more than a predetermined time the resetting spring 88 will return the ratchet wheel 82 to its normal position shown in a manner soon to be described.

For advancing or notching the ratchet wheel 82 in response to each opening operation of the recloser, a notching pawl 100 is provided. This notching pawl 100 is arranged to be energized by a notching solenoid 102 that is connected in a shunt circuit 103 paralleling the trip coil 68 of the recloser. Thus, each time the tripping relay 65 completes a tripping circuit through the trip coil 68, the notching solenoid 102 is energized to drive the pawl 100 to the right a predetermined distance. During this motion to the right, the notching pawl 100 is in engagement with a tooth of the ratchet wheel 82, and thus the ratchet wheel is advanced in a clockwise direction through one step in response to each tripping operation of the recloser. When the recloser trips open in response to operation of its tripping solenoid 68, the "a" switch 69a opens to disconnect the notching circuit 103 from the positive bus 240 of the tripping source S. This deenergizes the notching solenoid 102, allowing a reset spring 104 to return the notching pawl 100 to its position of FIG. 1. When the notching pawl returns to its position of FIG. 1, a stationary pin 105 engages the notching pawl, camming it upwardly to disengage it from the periphery of the ratchet wheel 82 so that the ratchet wheel is later able to reset without interference from the notching pawl 100 should more than a predetermined time elapse between successive openings of the recloser.

For preventing the resetting spring 88 from causing the ratchet wheel 82 to reset from an advanced position to its normal-at-rest position of the drawing between closely successive opening operations of the recloser, a holding pawl 110 acting on the periphery of the other ratchet wheel 83 is provided. This holding pawl is biased about a stationary pivot 111 into engagement with the periphery of ratchet wheel 83 by a spring 112. If successive advancing operations of the notching pawl 100 closely follow one another then the holding pawl 110 will maintain the ratchet wheels 82 and 83 in their advanced position between advancing operations. Under such conditions, the notching operations will have a cumulative effect in advancing the ratchet wheel 82 and will thus drive the switching arms 86 and 87 successively through positions 2, 3, 4 and 5 in response to closely successive opening operations of the recloser 10.

If, on the other hand, the notching operations of notching pawl 100 do not closely follow one another, the holding pawl 110 will eventually be disabled, i.e., moved out of engagement with the ratchet wheel 83 to allow resetting of ratchet wheels 82 and 83 back to their position of the drawing under the influence of reset spring 88. Such disabling of the holding pawl 110 is effected (in a manner soon to be described) by a reset solenoid 114 which operates a predetermined time after the recloser 10 reaches closed position to drive the holding pawl 110 clockwise out of engagement with ratchet wheel 83, assuming that the recloser remains closed. In more general terms, the overall effect of this resetting operation is to restore the sequencing device 80 to its normal at-rest position of the drawing in the event that the recloser is able to remain closed, say, as a result of the fault on the power line 12 disappearing or having been removed.

As was pointed out hereinabove, the switching arm 87 of the stepping switch F sets up an energizing circuit for the reclosure-initiating relay 79 each time it moves into new positions 2, 3 and 4. The energizing circuit for relay 79 that is established by movement of the switching arm 87 into position 2 has been described hereinabove. Briefly summarizing, however, this energizing circuit extends from one bus 72 to the opposite bus 74 through the conductive parts 92, 93, 87, 2, 94—97, 306, 77b and 79. Completion of this energizing circuit causes the reclosure-initiating relay 79 to operate and thus effect closing of the recloser. Should the fault on power line 12 still be present when the recloser is reclosed, then the recloser would again trip open and notching solenoid 102 would respond by advancing the switching arm 87 through another step into contact position 3. Movement of the switching arm into the contact position 3 results in completion of another energizing circuit for reclosure-initiating relay 79, but only after a predetermined time delay, which constitutes a time delay between opening and reclosing of the circuit breaker. In this regard, movement of the switching arm 87 into position 3 first produces energization of a time delay pickup relay 120. This relay 120 is preferably of the thermally-operated type so that it closes its contact 122 after current has flown through its thermal element for a predetermined period. When the contacts 122 are closed after this predetermined period, they complete an energizing circuit for the reclosure-initiating relay 79 to effect another closing operation of the recloser. The energizing circuit for the thermal relay 120 is from one bus 72 through conductive parts 93, 87, 3, conductor 124, the thermal element of relay 120, and conductor 126 to the opposite bus 74. The energizing circuit for the reclosure-initiating relay 79 that results from closing of the contacts 122 of the thermal relay is from bus 72 through conductive parts 92, 93, 87, 3, conductor 124, contacts 122, conductors 127, 95, 96, 97, 77b, and the coil of relay 79 to the opposite bus 74.

Should the fault on the line 12 still be present when the recloser closes, the recloser will again trip open and notching solenoid 102 would respond by advancing the sequencing device 80 one step to move the switching arm 87 into its position 4. This results in completion of another energizing circuit for reclosure-initiating relay 79, but only after a predetermined time delay, which constitutes a time delay between the third opening and reclosing of the circuit recloser. This time delay is introduced by another thermally controlled relay 130 (corresponding to the previously described relay 120) which operates after a predetermined interval to close its contacts 132 and complete an energizing circuit for the reclosure-initiating relay 79 that extends through the switching arm 87, contact 4, contacts 132, and conductor 134. The reclosure-initiating relay 79 responds by again causing the recloser to reclose.

*Lock-Out*

If the fault should still be present on power line 12 when the third reclosing has occurred, the recloser will again trip open, but after this opening operation no further reclosing operations will occur until the recloser is manually reset. In other words, the recloser will be locked out.

This lockout action occurs by virtue of the fact that the switching arm 87 moves into contact position 5 after the fourth closely successive opening operation. No circuit through the reclosure-initiating relay 79 results from motion of the switching arm 87 into position 5 because the reclosure-initiating relay 79 is isolated from the contact 5 by means of a then-open "a" switch 136a. This switch 136a is controlled in a known manner (not shown) by the position of the circuit recloser and opens as soon as the recloser opens, closing when the circuit recloser closes. Thus, no energizing circuit for the relay 79 can be established through contact point 5. Since no other connections are then present from the relay 79 to the positive bus 72, the reclosure-initiating relay 79 remains deenergized and thus no further closing operations of the recloser occur.

To provide an indication of lockout, a lockout-indicating light L is provided in circuit with the contact 5 of the switching arm 87. When the switching arm 87 reaches contact 5, an energizing circuit through this lock-out-indicating light would be established. This energizing circuit extends from positive bus 72 through parts 92, 93, 87, 5, 137 and L to the negative bus 74.

*Reset of Recloser if Recloser Is Able To Remain Closed*

As was pointed out hereinabove, sequencing device 80 is adapted to reset to its normal at-rest position of FIG. 1 if the recloser should remain closed after any reclosing operation prior to lockout. This resetting action is effected by releasing the holding pawl 110 from the ratchet wheel 83 a predetermined time after the breaker reaches closed position should it remain closed. Release of the holding pawl 110 from the ratchet wheel is referred to hereinafter as activation of the resetting means 88, since it is this release that allows the resetting spring 88 to effect a resetting operation of the sequencing device 80. A resetting solenoid 114 is relied upon for such activation and is controlled by a normally-open switch 150 which is caused to close a predetermined time after the breaker reaches closed position should the breaker remain closed. For effecting closing of the normally open switch 150 in this manner, reset control means comprising a timing motor 152, preferably of the synchronous type, and a rotary cam 154 coupled to the rotor of the motor 152 are provided. As soon as the recloser reaches closed position, the motor 152 is energized through a circuit that includes the last contact made by the switching arm 87. For example, when the switching arm is in position 2, this circuit for motor 150 extends from one bus 72 through conductive parts 92, 93, 87, 2, 94, 306, 95, 96, 155, a then-closed "a" switch 157a, conductors 158, 159, then-closed switch 160, and then through the motor 152 to the opposite bus 74. This circuit is completed upon closing of the circuit recloser by the "a" switch 157a which is controlled in a conventional manner (not shown) to open in response to closing of the circuit recloser, so that operation of the motor 152 begins only when the recloser reaches closed position. The motor responds by driving the cam 154 clockwise in a direction to close the switch 150. The motor is continuously energized so long as the recloser remains closed or until a limit switch 160 is opened by the motor at the end of its travel. If the recloser remains closed for a long enough time, the cam 154 will eventually close the switch 150 and shortly thereafter open the limit switch 160. Closing of the switch 150 completes an energizing circuit for the reset solenoid 114 through the conductive parts 163, 150, 162, etc. Completion of this energizing circuit causes the solenoid 114 to release the holding pawl 110 and allows the sequencing device 80 quickly to reset under the influence of its then-activated reset spring 88, as described hereinabove. Opening of the limit switch 160 effects deenergization of the motor 152, allowing the return spring 165 quickly to reset the cam 154 to its normal position of FIG. 1.

Had the recloser, instead of remaining closed, reopened shortly after reclosing, then no release of the holding pawl 110 would have occurred. In this connection, opening of the recloser would have taken place before the timing motor 152 would have had an opportunity to close the switch 150, and thus the timing motor would have been deenergized by the opening of the "a" switch 157a, which opens when the recloser opens.

This would have allowed motor-reset spring 165 to quickly return the cam 154 to its normal position of the drawing, and no releasing of the holding pawl 110 would have occurred. This would permit cumulative advancement of the sequencing device, as is desired when the recloser opens shortly after reclosing.

Certain features of the resetting means for the sequencing device 80 are the invention of A. L. Streater and R. H. Miller and are described in more detail and claimed in application S.N. 119,884, assigned to the assignee of the present invention.

Controlling the Opening Time Characteristics

Most present day reclosers have two time-current characteristics controlling the period of time that elapses between the instant that overcurrent commences and the instant that the recloser opens its contacts. Typically, the first one or two opening operations in a series of closely successive opening operations occur with relatively little time delay, but subsequent opening operations occur with appreciably greater time delay. The opening operations that occur with little time delay will be referred to hereinafter as quick opening operations, whereas those opening operations that occur with appreciably greater time delay will be referred to as delayed opening operations.

For determining whether an opening operation shall be a quick operation or a delayed operation, the disclosed recloser relies upon the switching arm 86 to control the amount of capacitance that will be present in the R-C timing circuit for each opening operation. In this connection, a capacitor 200 having a relatively large capacitance in comparison to that of capacitor 34 is provided; and the switching arm 86 switches this capacitor 200 into the R-C circuit in parallel relationship to the capacitor 34 for those opening operations that it is desired should be delayed opening operations.

In this connection, the capacitor 200 has one of its terminals connected to the negative terminal of capacitor 34 through the negative bus 73 and has the connection between its other terminal and the conductor 210 on which signal voltage appears controlled by the switching arm 86. The contact points 1, 2, 3 and 4 of the switching arm 86 are connected to the positive terminal of the capacitor 200, and in each of these connections there is a manually operable switch that can be opened if it is desired that the opening operation corresponding to that particular point be a quick operation or can be closed if it is desired that the corresponding opening operation be a delayed operation. In the disclosed recloser, the manually operable switches 201 and 202 for the contact points 1 and 2, respectively, are shown open; and the manually-operable switches 203 and 204 for the contact points 3 and 4 are shown closed. Accordingly, the recloser is set so that the first two opening operations will be quick operations and the third and fourth opening operations will be delayed operations.

In this regard, the switching arm 86 will be in contact position 1 during the timing interval immediately preceding the first opening operation, and hence the capacitor 200 will be out of the circuit for this first opening operation due to the open switch 201 and will therefore introduce no delay. As pointed out hereinabove, the first opening operation results in the notching solenoid 102 advancing the ratchet wheel 82 and the switching arm 86 through one step into contact position 2. If a second opening operation should closely follow the first opening operation, the switching arm 86 would be in contact position 2 during the timing interval immediately prior to the second opening operation, and thus the capacitor 200 would again introduce no delay, this time due to the open switch 202.

If a third opening operation closely follows the second one, the switching arm 86 would be in contact position 3 during the timing interval immediately preceding the third opening operation. This would result in capacitor 200 being connected in the R-C timing circuit during this interval, and thus the third opening operation would be delayed. The circuit that connects the capacitor 200 in the R-C circuit in parallel with the smaller capacitor 34 extends from the signal voltage bus 210 through conductor 212 switching arm 86, contact point 3, switch 203, and the capacitor 200 to the negative bus 73.

If a fourth opening operation closely followed the third opening operation, the switching arm 86 would be in contact position 4 during the time interval immediately preceding the fourth opening operation, and this would result in the capacitor 200 again being present in the R-C timing circuit to delay opening inasmuch as the switch 204 is closed.

Closing of the Recloser After Lock-Out

Restoration of the recloser to its closed position after lock-out is effected by moving the conductive switching member 92 into engagement with a contact 310. This completes an energizing circuit 312 through the coil of solenoid 114, causing the solenoid to release the holding pawl 110. This allows the reset spring 88 of the sequencing device 80 to quickly return the sequencing device from its lock-out position 5 to its normal-at-rest position 1. The switching member 92 is thereafter returned to its position shown in the drawing, thus completing an energizing circuit for closing relay 79 through switching member 87, contact point 1, conductor 314 and "b" switches 315b and 77b, both of which are closed when the recloser is open. The closing relay 79 responds to completion of this energizing circuit by closing its contacts 78 to produce a closing operation of the recloser in the manner described hereinabove.

After a recloser has locked out, it usually remains open for a relatively long time, and the various loads connected thereto are therefore deenergized and cease operating. In many circuits, these loads are constituted by motors and similar devices that demand a much higher current for starting than for running. Accordingly, when the recloser in such a circuit is restored to its closed position following such a lockout period, a heavy inrush current flows in view of the simultaneous demand of the loads for high starting current.

If the circuit is to be successfully reenergized without unnecessary interruptions, the recloser must be able to remain closed despite this high inrush current. For rendering the recloser capable of remaining closed despite the high inrush current, we rely upon the manually-operable switch 201. By operating this switch from its open position shown to a closed position A, we can connect the large capacitor 200 into the timing circuit. Thus, the recloser is set for a delayed first operation instead of the instantaneous first operation for which it was previously set. Accordingly, when the high inrush current flows immediately following restoration of the recloser to its closed position after lockout, the recloser does not immediately open. In most cases, there is enough time delay available due to the presence of capacitor 200 to allow the inrush current to subside to a level below the pickup value of gating relay 45, i.e., twice normal current, before the capacitor 200 becomes charged to a high enough voltage to fire the level detector 60. Although the gating relay 45 might pick up in response to the high inrush current, it drops out before the level detector 60 can be fired—unless the inrush current is unusually prolonged. Thus, in most cases, the recloser remains closed against the inrush currents, thereby allowing the power circuit 12 to be successfully reenergized without unnecessary interruptions by the recloser.

It may happen that a fault is present on the power circuit 12 when the recloser is returned to its closed position after lockout. If this is the case, a current, commonly termed a fault current, very much higher than an ordinary inrush current will begin flowing immediately upon closing. It is important that the recloser be capable of quickly opening to interrupt any such fault current before damage to the system can occur.

Our recloser can open in the desired manner in response to fault currents since fault currents will produce a much higher signal voltage across the rectifier 24 than ordinary inrush currents. This higher signal voltage will cause the timing capacitor 200 to be much more quickly charged to the voltage level required to fire the level detector 60. Thus, tripping will occur quickly in response to such fault currents and this despite the fact that the recloser is partially desensitized to inrush currents.

In certain circuit applications, it may happen that ordinary inrush currents will persist at a high level long enough to trip the recloser despite the time delay introduced by capacitor 200. To prevent the recloser from unnecessarily tripping in response to such prolonged inrush currents, we provide a desensitizing circuit 300 about the coil 46 of the gating relay 45. This desensitizing circuit comprises the series combination of a manually operable switch 301 and a resistor 304. The manually operable switch 301 is mechanically coupled to the manually operable switch 201, so that operation of the switch 201 into its positions A, B, and C causes the switch 301 to move into its positions A, B, and C simultaneously with entry of the switch 201 into its respective positions A, B, and C. In other words, the switches 201 and 301 can be operated into corresponding positions by a single operation common to the two switches. The manually-operable switch 301 is normally open so that normally the resistor 304 is effectively out of the circuit. When the switch 301 moves into position A in response to the above-described movement of switch 201 into position A, the resistor 304 is still out of the circuit since point A of switch 301 has no connection to resistor 304. When, however, the switches 201 and 301 are moved one step further into position B, the desensitizing circuit 300 is completed, and the resistor 304 is thus connected about the coil 46 of the gating relay. The capacitor 200 is still connected in the timing circuit in view of the connection between the point B of switch 201 and the capacitor 200.

The presence of the resistor 304 about the coil 46 decreases the amount of current that will flow through the coil 46 for a given signal voltage and thus raises the pickup value of the gating relay 45. In one embodiment of our invention, for example a 400 ampere recloser, the size of the resistor 304 is selected so that the gating relay 45 will pick up at 1250 amperes of line current instead of at the 800 ampere value at which it normally picks up. With this higher pickup value, the recloser will be able to remain closed despite inrush currents up to 1250 amperes. Even for those inrush currents above 1250 amperes, the recloser can remain closed providing the inrush current does not persist at a level above 1250 amperes for a sufficient length of time to charge the capacitor 200 to the firing voltage of the level detector 60.

In some cases, it may be desirable to cause the recloser to trip without significant time delay in response to currents in excess of ordinary inrush currents. To accommodate such a requirement, the position C is provided for each of the two manually-operable switches 201 and 301. Movement of the switch 201 into position C causes the switch 301 to move into its position C, resulting in a circuit in which the desensitizing resistor 304 is still connected about the coil 46 of the gating relay, but the timing capacitor 200 is removed from the circuit. Thus, if the inrush current should exceed the assumed pickup value of 1250 amperes, the recloser would trip immediately without being delayed by the capacitor 200.

In view of the above description, it should be apparent that a wide variety of operating characteristics can be readily obtained with our recloser during the period immediately following reclosure after the lockout period. We can either increase the time delay or the amount of line current required for tripping or can increase both of these quantities. These changes can be made simply by operating switch 201 to the position corresponding to the type of performance desired. In an actual recloser, each of these positions is provided with sufficient indicia (not shown) to provide the operator with guidance as to the type of performance available.

It should be apparent that if only an adjustment in the time delay period is needed or desired to provide cold load pickup, then the desensitizing circuit 300 can be omitted and the desired adjustment obtained solely by reliance on the switch 201.

If it should be desired to cause the recloser to lock out after a single operation instead of the four opening operations described hereinabove, this can be easily effected simply by opening a manually-operable switch 306 connected in the circuit 94. This isolates the closing control relay 79 from control power, thus preventing reclosing. Thus, our recloser can be set to lockout on the first opening operation following reclosing or, if desired, after the entire sequence.

To provide an indication of lock-out after the first recloser-opening operation, an indicating circuit 307 is provided for establishing an energizing circuit through the lock-out light L when the switching arm 87 is in position 2 and the manually-operable switch 306 is in its open position contacting point a.

While we have shown and described a particular embodiment of our invention, it will be obvious to those skilled in the art that various changes and modifications may be made without departing from our invention in its broader aspects. We, therefore, intend in the appended claims to cover all such changes and modifications as fall within the true spirit and scope of our invention.

What we claim as new and desire to secure by Letters Patent of the United States is:

1. An automatic circuit recloser comprising means for opening said recloser in response to an overcurrent, reclosing means for automatically reclosing said recloser following an opening operation, sequencing means advanceable in a step-by-step manner from a normal position through a series of intermediate positions to a lock-out position in response to closely successive operations of said recloser, said reclosing means being inoperable to automatically reclose said recloser when said sequencing means is in said lock-out position, whereby lock-out of said recloser is effected when said sequencing means is in said lock-out position, manually controlled means for restoring said sequencing means to said normal position following lockout, means effective when said sequencing means has been restored to said normal position to cause said reclosing means to reclose said recloser, a timing circuit for controlling the opening time of said recloser, said timing circuit including a capacitor that can be connected into and disconnected from said timing circuit, the opening time when said capacitor is connected therein being longer than when said capacitor is disconnected therefrom, a manually-operable switch in series with said capacitor, switching means controlled by said sequencing means and in series with said manually-operable switch and said capacitor for connecting said capacitor into said timing circuit when said sequencing means is in its normal position and said manually-operable switch is closed, said manually-operable switch being effective in an open position to disconnect said capacitor from said timing circuit while said sequencing means is in said normal position, said manually-operable switch being movable into its closed position after lockout and before a subsequent reclosing so that increased time delay is available on the first opening operation immediately following reclosing after lockout.

2. In the automatic recloser of claim 1, gating means for rendering said timing circuit active in response to overcurrents above a predetermined value and for causing opening of said recloser after an interval determined by said timing circuit, and means controlled by said manually-operable switch for changing the value of overcurrent at which said gating means operates.

3. In the automatic recloser of claim 1, gating means for rendering said timing circuit active in response to overcurrents above a predetermined value and for causing opening of said recloser after an interval determined by said timing circuit, a desensitizing circuit connected in circuit with said gating means and effective when operable to increase the value of overcurrent at which said gating means operates, a desensitizing switch connected in said desensitizing circuit for rendering said desensitizing circuit operable when moved into a predetermined position, and means for coupling said desensitizing switch and said manually-operable switch together so that said two switches can be moved by a common operation into positions wherein said desensitizing circuit is operable and said capacitor is connected into said timing circuit.

4. The recloser of claim 3 in which said desensitizing switch and said manually-operable switch each have another position into which they can be moved to effect disconnection of said capacitor from said timing circuit while maintaining said desensitizing circuit operable.

5. In the automatic recloser of claim 1, gating means for rendering said timing circuit active in response to overcurrents above a predetermined value and for causing opening of said recloser after an interval determined by said timing circuit, a desensitizing circuit connected in circuit with said gating means and effective when operable to increase the value of overcurrent at which said gating means operates, a desensitizing switch connected in said desensitizing circuit for rendering said desensitizing circuit operable when moved into a predetermined position, and means for coupling said desensitizing switch and said manually-operable switch together so that said two switches can be moved by a common operation into positions wherein said desensitizing circuit is operable and said capacitor is disconnected from said timing circuit.

6. The recloser of claim 1 in combination with additional switching means individual to the respective intermediate positions of said sequencing means and controlled by said sequencing means for connecting said capacitor into said timing circuit when said sequencing means is in a corresponding intermediate position, and additional manually-operable switches individual to the respective intermediate positions of said sequencing means for selectively removing said capacitor from or connecting said capacitor into said timing circuit when said sequencing means is in a corresponding intermediate position.

References Cited in the file of this patent
UNITED STATES PATENTS

| | | |
|---|---|---|
| 2,120,855 | Buell | June 14, 1938 |
| 2,549,336 | Rawlins et al. | Apr. 17, 1951 |
| 2,601,188 | Wallace | June 24, 1952 |